(12) United States Patent
Sue et al.

(10) Patent No.: US 8,910,531 B1
(45) Date of Patent: Dec. 16, 2014

(54) SYSTEM FOR DETERMINING TARGET MISALIGNMENT IN TURBINE SHAFT AND RELATED METHOD

(71) Applicant: General Electric Company, Schenectady, NY (US)

(72) Inventors: Peter Ping-Liang Sue, Greenville, SC (US); Lawrence Brown Farr, II, Greenville, SC (US); Andrea Booher Kretschmar, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 13/934,599

(22) Filed: Jul. 3, 2013

(51) Int. Cl.
*G01L 3/00* (2006.01)
*G01D 7/00* (2006.01)
*G01M 15/14* (2006.01)
*F01D 21/00* (2006.01)
*G01B 5/14* (2006.01)

(52) U.S. Cl.
CPC ............. *G01M 15/14* (2013.01); *F01D 21/003* (2013.01); *G01B 5/14* (2013.01)
USPC .................................. 73/862.08; 73/862.041

(58) Field of Classification Search
USPC ....................................... 73/862.08, 862.041
See application file for complete search history.

(56) References Cited

U.S. PATENT DOCUMENTS

| 6,795,779 | B2 | 9/2004 | Delvaux et al. |
| 7,414,363 | B2 | 8/2008 | Yokoyama et al. |
| 7,415,363 | B2 * | 8/2008 | Sue ................................ 702/41 |
| 8,042,412 | B2 * | 10/2011 | Xia et al. ................. 73/862.324 |
| 2007/0078622 | A1 * | 4/2007 | Sue ............................... 702/151 |
| 2012/0210767 | A1 * | 8/2012 | Sue et al. ....................... 73/1.09 |

* cited by examiner

*Primary Examiner* — Lisa Caputo
*Assistant Examiner* — Jamel Williams
(74) *Attorney, Agent, or Firm* — Ernest G. Cusick; Hoffman Warnick LLC

(57) ABSTRACT

Systems and devices configured to determine misalignment of targets of a rotating shaft by monitoring axial and radial aspects of targets and the shaft. In one embodiment, a target monitoring system includes a first horizontal probe communicatively connected to at least one first horizontal target connected to the shaft, and a first axial probe located adjacent to the first horizontal probe and communicatively connected to the first horizontal target. The system also includes a second horizontal probe communicatively connected to at least one second horizontal target connected to the shaft, and a second axial probe located adjacent to the second horizontal probe and communicatively connected to the second horizontal target. The system may further include an end probe disposed proximate a first end of the shaft for monitoring axial movement of the shaft, and a computing device communicatively connected to the end probe and each horizontal and axial probe.

20 Claims, 9 Drawing Sheets

SYSTEM FOR DETERMINING TARGET MISALIGNMENT IN TURBINE SHAFT AND RELATED METHOD

BACKGROUND OF THE INVENTION

The subject matter disclosed herein relates to a system for determining torsional displacement of a rotating shaft, and, more specifically, to a system and method for determining movement of a power generation system shaft and/or targets during operation.

Some power plant systems, for example certain nuclear, simple cycle, and combined cycle power plant systems, employ turbines in their design and operation. Some of these turbines include shafts which during operation are rotated at high speeds to transfer torque about the turbine and power generation system (e.g., from prime drivers to generators). These shafts may have long axial dimensions relative to respective thicknesses/radial dimensions of the shaft. As a result of these long axial dimensions and the magnitude of the torque transferred, these shafts may experience torsional displacement which may cause a first end of any given shaft to be displaced/twisted, and/or radially shifted relative to a second end of the shaft during operation. In some power generation systems the power output of turbines may be determined by monitoring a set of targets disposed circumferentially about the shaft, the displacement of these targets relative to one another providing a measurement of the twist imposed on the shaft due to torque on the shaft. When errors caused by radial movement are eliminated, the angle of twist on the shaft can be determined and related to a calibration. As a result, known, controlled and measured forces are applied to the shaft, and a highly accurate measure of the associated power output of the turbine may be delivered. Employment of a method that includes disposing a plurality of sensors at each end about the shaft in communication with a set of a plurality of targets disposed about each end of the shaft allows determination of the aforementioned error in measurement due to radial motion of the shaft. However, these systems may not be able to monitor axial shaft movement and/or may not be able to determine the effects of the shaft movement on the accuracy of torque measurements. Additionally, if the targets are not parallel to a centerline of the shaft, the measurement may introduce another error into the measured angle of twist of the shaft which may limit process accuracy and thus reduce the accuracy of the torque and power output determinations.

BRIEF DESCRIPTION OF THE INVENTION

Systems and devices configured to monitor displacement of a rotating shaft by monitoring axial and radial targets are disclosed.

A first aspect of the invention includes a target monitoring system having: a first horizontal probe located radially outboard of a shaft and communicatively connected to at least one first horizontal target connected to the shaft, the at least one first horizontal target disposed proximate a first end of the shaft; a first axial probe located axially adjacent to the first horizontal probe and communicatively connected to the at least one first horizontal target; a second horizontal probe located radially outboard of the shaft communicatively connected to at least one second horizontal target connected to the shaft, the at least one second horizontal target disposed proximate a second end of the shaft; a second axial probe located axially adjacent to the second horizontal probe and communicatively connected to the at least one second horizontal target; an end probe disposed proximate the first end of the shaft, the end probe configured to monitor axial movement of the shaft; and a computing device communicatively connected to the end probe and each of the first horizontal probe, the first axial probe, the second horizontal probe, and the second axial probe, wherein the computing device configured to: determine a first gradient for the at least one first horizontal target based on a displacement between the first horizontal probe and the at least one first horizontal target and the first axial probe and the at least one first horizontal target; and determine a second gradient for the at least one second horizontal target based on a displacement between the second horizontal probe and the at least one second horizontal target and the second axial probe and the at least one second horizontal target.

A second aspect of the invention includes a method including: determining a first primary displacement between a first horizontal probe and at least one first target on a shaft, the at least one first target located proximate a first end of the shaft; determining a second primary displacement between a first axial probe and the at least one first target; calculating a first gradient of the at least one first target based on the first primary displacement and the second primary displacement; monitoring axial movement of the shaft via an end probe; and determining an amount of false twisting of the shaft at load condition based on: a difference between the first gradient and a calculated second gradient; and the axial movement of the shaft.

A third aspect of the invention includes a turbine having: a stator; a working fluid passage substantially surrounded by the stator; and a shaft configured radially inboard of the stator and in the working fluid passage; and a target monitoring system communicatively connected to the shaft and configured to monitor displacement of the shaft during operation of the turbine, the target monitoring system including: a first horizontal probe located radially outboard of the shaft and communicatively connected to at least one first horizontal target connected to the shaft, the at least one first horizontal target disposed proximate a first end of the shaft; a first axial probe located axially adjacent to the first horizontal probe and communicatively connected to the at least one first horizontal target; a second horizontal probe located radially outboard of the shaft communicatively connected to at least one second horizontal target connected to the shaft, the at least one second horizontal target disposed proximate a second end of the shaft; a second axial probe located axially adjacent to the second horizontal probe and communicatively connected to the at least one second horizontal target; an end probe disposed proximate the first end of the shaft, the end probe configured to monitor axial movement of the shaft; and a computing device communicatively connected to the end probe and each of the first horizontal probe, the first axial probe, the second horizontal probe, and the second axial probe, wherein the computing device configured to: determine a first gradient for the at least one first horizontal target based on a displacement between the first horizontal probe and the at least one first horizontal target and the first axial probe and the at least one first horizontal target; and determine a second gradient for the at least one second horizontal target based on a displacement between the second horizontal probe and the at least one second horizontal target and the second axial probe and the at least one second horizontal target.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-10, like numbering may represent like elements. Redundant explanation of these elements has been omitted for clarity. Finally, it is understood that the components of FIGS. 1-10 and their accompanying descriptions may be applied to any embodiment described herein.

DETAILED DESCRIPTION OF THE INVENTION

Aspects of the invention provide for a target monitoring system which includes an end probe (e.g., a Bentley Nevada probe, clearance probe, a proximity probe, a magnetic pick-up sensor, etc.) configured to determine axial movement of a rotating shaft and a set of axial probes configured to determine the gradient of misalignment for each target by monitoring changes in the displacement of each target disposed on the shaft.

In contrast to conventional approaches, aspects of the invention include an end probe and a set of axial probes which are disposed proximate sets of horizontal and vertical probes and configured to monitor a set of targets on the shaft. During operation the target monitoring system monitors the displacement of the set of targets relative to at least one of an axial probe and a horizontal and/or vertical probe to determine a gradient of misalignment for each target. An end probe monitors axial movement of the shaft itself during operation, and the system is able to determine the amount of false twisting of the rotating shaft by considering the product of the gradient and the axial movement, and incorporating this false twisting into the torque and/or power output calculation for correction.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location.

Figure 1:
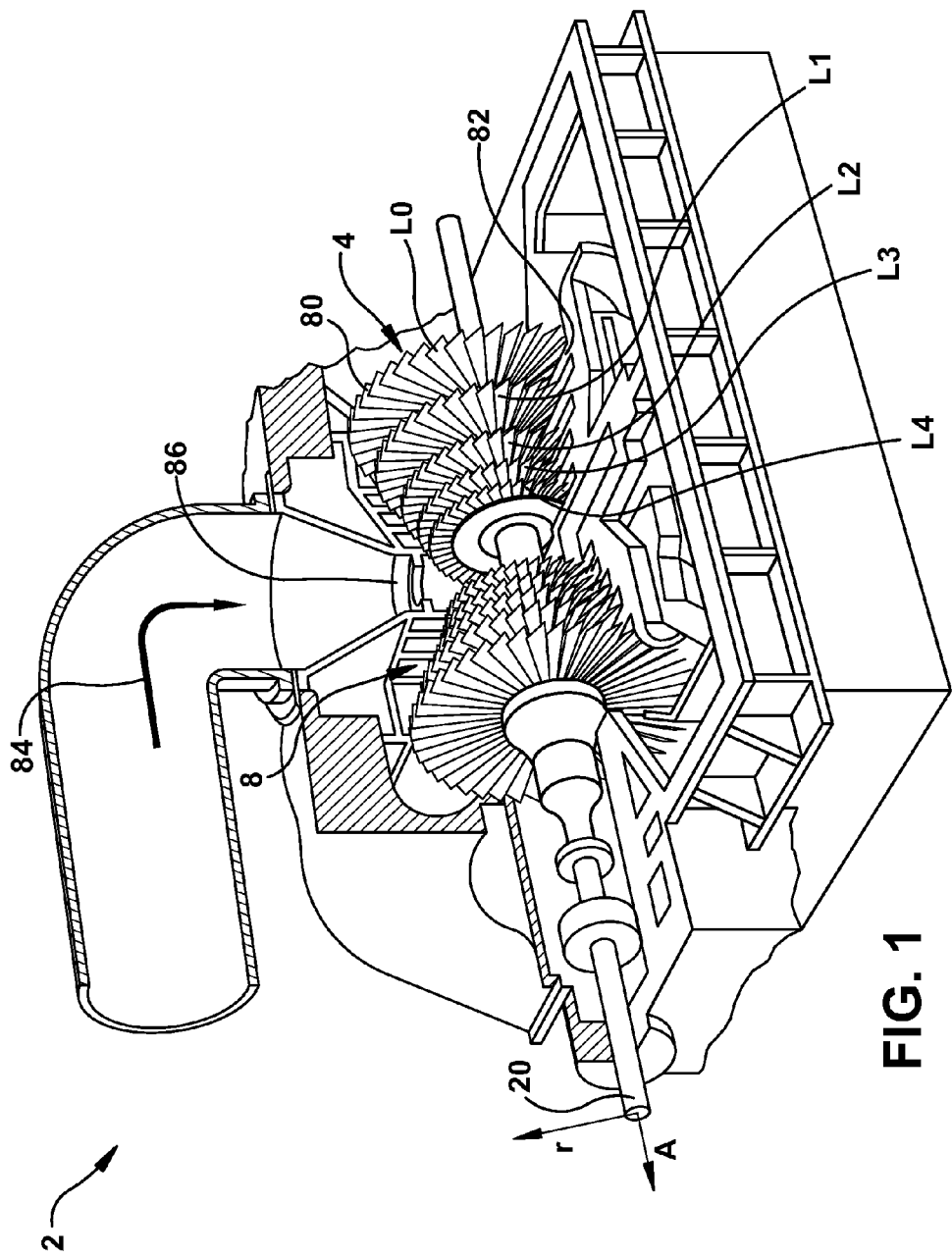
FIG. 1 shows a three-dimensional partial cut-away perspective view of a portion of a turbine according to an embodiment of the invention.

Turning to the FIGURES, embodiments of systems and devices are shown, which are configured to determine torsional displacement of a rotating shaft including axial displacements of the shaft during operation by monitoring a set of targets disposed about the shaft with a set of probes. Each of the components in the FIGURES may be connected via conventional means, e.g., via a common conduit or other known means as is indicated in FIGS. 1-10. Referring to the drawings, FIG. 1 shows a perspective partial cut-away illustration of a gas or steam turbine 2. Turbine 2 includes a rotor 4 that includes a rotating shaft 20 and a plurality of axially spaced rotor wheels 8. A plurality of rotating blades 80 are mechanically coupled to each rotor wheel 8. More specifically, blades 80 are arranged in rows that extend circumferentially around each rotor wheel 8. A plurality of stationary vanes 82 extend circumferentially around shaft 20, and the vanes are axially positioned between adjacent rows of blades 80. Stationary vanes 82 cooperate with blades 80 to form a stage and to define a portion of a flow path through turbine 2.

In operation, gas 84 enters an inlet 86 of turbine 2 and is channeled through stationary vanes 82. Vanes 82 direct gas 84 against blades 80. Gas 84 passes through the remaining stages imparting a force on blades 80 causing shaft 20 to rotate. At least one end of turbine 2 may extend axially away from rotating shaft 20 and may be attached to a load or machinery (not shown) such as, but not limited to, a generator, and/or another turbine.

In one embodiment, turbine 2 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 2:
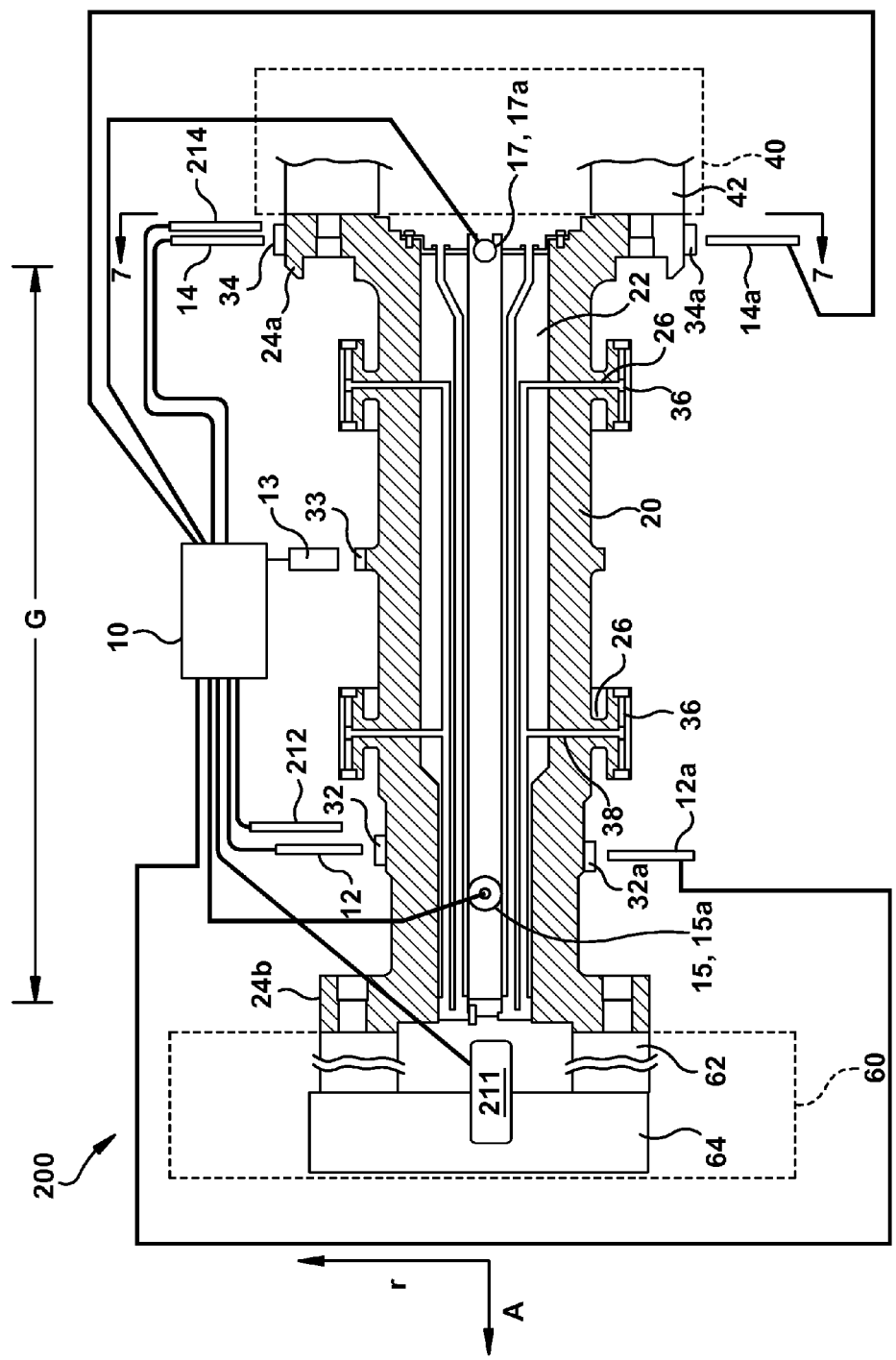
FIG. 2 shows a cross-sectional view of a rotating shaft in a simple cycle power generation system in accordance with embodiments of the invention.

Turning to FIG. 2, a cross-sectional view of a portion of a target monitoring system 200 connected to a shaft 20 while a torque 27 is acting on shaft 20 that serves as a load coupling shaft is shown according to embodiments of the invention. Target monitoring system 200 includes a first axial probe 212 located proximate a first horizontal probe 12, a second axial probe 214 located proximate a second horizontal probe 14, and an end probe 211 located at an axial end of shaft 20. In an embodiment, first axial probe 212 may be axially adjacent first horizontal probe 12 and second axial probe 214 may be axially adjacent second horizontal probe 14. In one embodiment, first axial probe 212 may be located about 1 inch axially distant from first horizontal probe 12 and second axial probe 214 may be located about 1 inch axially distant from first horizontal probe 14.

Shaft 20 is connected at a first end 24a to shaft 42 of gas turbine 40 and connected at a second end 24b to a rotatable shaft 62 of power generator 60. Accordingly, shaft 20 forms a portion of a simple cycle configuration of a power generation system in the exemplary embodiment illustrated in FIG. 2. Shaft 20 may be rotated by gas turbine machine 40 and may transmit that rotation to rotatable shaft 62 of power generator 60. Rotatable shaft 62 of power generator 60 may be connected to a magnet 64 which may rotate with rotatable shaft 62 (and hence with shaft 20) within a stator (not shown) of power generator 60 to generate electric power. In an embodiment, shaft 20 may include a hollow area 22 and one or more passageways 26 leading to hollow area 22. A set of wires 38 may extend through passageways 26 and hollow area 22 to carry signals to and/or from a RF telemetry system 36. RF telemetry system 36 may be capable of rotating along with shaft 20 and transmits/receives signals to/from, for example, power generator 60 through set of wires 38 or wirelessly through a transmitting antenna of RF telemetry system 36. Target monitoring system 200 may include a pair of targets 32 and 34 which may be bonded on an outer surface of shaft 20 and mounted on opposite axial ends of shaft 20 at a distance 'G' relative to one another.

In an embodiment, targets 32 and 34 may be separated along the axial direction by about 80 inches, and a respective radii of the outer surface on which targets 32 and 34 may be bonded may be about 11 and about 22 inches, respectively. While FIG. 2 shows targets 32 and 34 being bonded on the outer surface of shaft 20 at different radii relative to one another, targets 32 and 34 may alternatively be mounted on an outer surface of shaft 20 at the same radii. In one embodiment, at least one of targets 32 and 34 may be formed by a pair of highly reflective tapes which are each capable of intensifying and reflecting a light signal which is incident on the tape. Each of targets 32 and 34 may be aligned at the same circumferential position or be circumferentially offset from one another. Additionally, it is understood that shaft 20 may include two sets of targets 32, 34, wherein each set of targets 32, 34 includes at least one target 32, 34. That is, targets 32,34 may each include a plurality of targets disposed circumferentially around shaft 20, such that the respective probes (e.g., first axial probe 212, second axial probe 214, first horizontal probe 12, second horizontal probe 14) of target monitoring system 200 may obtain data relating to targets 32 and 34, as discussed herein.

First axial probe 212, second axial probe 214, first horizontal probe 12 and second horizontal probe 14 are positioned at a perpendicular angle relative to the long axis of shaft 20. First axial probe 212, second axial probe 214, first horizontal probe 12 and second horizontal probe 14 may be aligned in the same axial planes as targets 32 and 34, respectively. However, it may be understood that first axial probe 212, second axial probe 214, first horizontal probe 12 and second horizontal probe 14 may not be aligned in the same axial planes as targets 32 and 34, respectively, as long as first axial probe 212, second axial probe 214, first horizontal probe 12 and second horizontal probe 14 remain in substantially the same axial and radial position relative to one another throughout the determining process discussed herein. That is, probe 212 and probe 12 may be positioned in the same circumferential position with respect to shaft 20, and probe 214 and probe 14 may be positioned in the same circumferential position with respect to shaft 20. Additionally, the circumferential position of probe 212 and probe 12 may or may not be in alignment with the circumferential position of probe 214 and probe 14. In one embodiment, first axial probe 212, second axial probe 214, first horizontal probe 12 and second horizontal probe 14 may consist of fiber optic elements for transmitting and receiving laser light signals.

During operation, first horizontal probe 12 and second horizontal probe 14 may monitor targets 32 and 34 to determine torsional displacement of the shaft as discussed herein. First axial probe 212, second axial probe 214, and end probe 211 may monitor shaft 20, and targets 32 and 34 to determine axial displacement (e.g., movement) of shaft 20 and target 32, 34 misalignments. At no load condition first horizontal probe 12 and first axial probe 212 may measure a displacement of target 32 between each probe 12 and 212, the ratio of this displacement to the axial distance between probe 12 and probe 212 representing the first gradient for misalignment of target 32. Similarly, at no load condition second horizontal probe 14 and second axial probe 214 may measure a displacement of target 34 between each probe 14 and 214, the ratio of this displacement to the axial distance between probe 14 and probe 214 representing the second gradient for misalignment of target 34. End probe 211 may measure axial movement of shaft 20 at load condition. During operation, a product of the gradient and the axial movement for each target represents an amount of false twisting for that target which may be factored into torque and/or power output determinations for increased accuracy.

In an exemplary embodiment according to the present invention, a third horizontal probe 12a and a fourth horizontal probe 14a may be employed, and positioned in a circular arc around and perpendicular to the long axis of shaft 20 at about 180 degrees from the positions of first horizontal probe 12 and second horizontal probe 14, respectively. Similarly, as shown in FIG. 2, first vertical probe 15 and second vertical probe 17 may be positioned in a circular arc around the shaft 20 at about 180 degrees separation from third vertical probe 15a and fourth vertical probe 17a, respectively. In one embodiment, as shown in FIG. 2, first horizontal probe 12, third horizontal probe 12a, second horizontal probe 14 and fourth horizontal probe 14a are positioned with 90 degrees of separation relative to one another in the same circular axial planes as the first vertical probes 15, third vertical probe 15a, second vertical probe 17, and fourth vertical probe 17a, respectively.

Probes 12, 12a, 14, 14a, 15, 15a, 17, 17a, 211, 212, and 214, may include laser light probes and may each be connected to a processor 10. More specifically, probes 12, 12a, 14, 14a, 15, 15a, 17, 17a, 211, 212, and 214 may include at least one of a Bentley Nevada probe, a clearance probe and/or a magnetic pick-up probe. Processor 10, as will be discussed in more detail below, is capable of calculating a torsional displacement (e.g., a circumferential twist) of rotating shaft 20 based upon measurements taken by probes 12, 12a, 14, 14a, 15, 15a, 17, 17a, 211, 212, and 214, and calculating a torque imposed on shaft 20 based on its torsional displacement. Processor 10 may include, for example, General Electric Aircraft Engine (GEAE) digital light probe system.

In an embodiment, target monitoring system 200 may include a revolutional target 33 which may be bonded to an outer surface of shaft 20 and may include a metal. In one embodiment, similar to targets 32 and 34, revolutional target 33 may rotate along with shaft 20. Revolutional target 33 may rotate proximate a revolutional probe 13 once per revolution of shaft 20. In an embodiment, revolutional probe 13 may be, for example, an eddy current probe which detects the presence of (metal) revolutional target 33. A signal from revolutional probe 13 may be triggered and sent to processor 10 once during every revolution of shaft 20 as revolutional target 33 passes by and is detected by revolutional probe 13. The trigger signal provided from revolutional probe 13 enables processor 10 to establish a reference zero timing for signals received by probe 12 and revolutional probe 13 for every revolution of shaft 20. Accordingly, a time measured from the reference zero time to the time first horizontal probe 12 and first vertical probe 15 receive a signal is started when revolutional probe 13 transmits a trigger signal to processor 10 in every revolution. In cooperation with revolutional target 33, revolutional probe 13 thus forms a "one per revolution sensor." The operation of revolutional probe 13 and revolutional target 33 may also provide information to allow processor 10 to calculate the rotational speed of shaft 20. In one embodiment, the rotational speed of shaft 20 may be determined by:

$$w = 2\pi(1/\Delta t),$$

where $\Delta t$ is the difference between two consecutive trigger signals sent from revolutional probe 13).

As shaft 20 rotates, first target 32 will pass once proximate probes 12, 12a, 15, and 15a upon every revolution of shaft 20. Similarly, as shaft 20 rotates, second target 34 will pass once proximate probes 14, 14a, 17, and 17a upon every revolution of shaft 20. The signals (e.g., laser light signals) transmitted by probes 12, 12a, 15, or 15a, and 14, 14a, 17, or 17a will be incident on targets 32 and 34, respectively, as those targets 32 and 34 pass proximate the respective probes as shaft 20 rotates. Targets 32 and 34 may intensify and reflect the transmitted signals incident on targets 32 and 34 which may effectively form response signals (e.g., laser light signals formed in response to the transmitted signals incident on targets 32, and 34) are received by probes 12, 12a, 15, or 15a, and 14, 14a, 17, or 17a which may then send corresponding signals to processor 10. Processor 10 may determines and record the time at which the signal reflected by target 32 is received by probes 12, 12a, 15, or 15a and the time at which the signal reflected by target 34 is received at probes 14, 14a, 17, or 17a. The difference between the respective reception times of the reflected signals by probes 12, 12a, 15, or 15a, and 14, 14a, 17, or 17a may then be detected. For example, a difference of time of as small as about 10 nanoseconds may be detected.

The first horizontal probe 12, third horizontal probe 12a, first vertical probe 15 and third vertical probe 15a transmit first transmission first and second signals and receive first horizontal first and second responses to/from the first target 32. The first vertical probe 15, third vertical probe 15a, second vertical probe 17, and fourth vertical probe 17a transmit second vertical first and second transmissions and receive second vertical first and second responses to/from the second target 34.

The difference in time between the signal receptions by probes 12, 12a, 14, 14a, 15, 15a, 17, and 17a may change as different levels of torque are applied to rotating shaft 20. After processor 10 has determined the difference in time, processor 10 can then determine an angular torsional displacement of shaft 20. As an example, the torsional displacement measured in radians may be calculated, assuming the circumferential positions of targets 32 and 34 on shaft 20 are the same (e.g., targets 32 and 34 are circumferentially aligned), by multiplying $\Delta t$ times w, where $\Delta t$ is the time difference between the receptions of signals by probes (12, 12a, 15, and 15a) and probes (14, 14a, 17, and 17a) and w is the rotational speed of shaft 20. The rotational speed w of shaft 20 may be determined from the operation of revolutional probe 13 and revolutional target 33 as discussed above.

Signals received by laser light probes 12, 12a, 14, 14a, 15, 15a, 17, and 17a when a measurable torque is imposed on shaft 20 may vary as a result of torsional displacement (i.e., circumferential twist). Targets 32 and 34 which were previously circumferentially aligned therefore become circumferentially offset from one another so that the respective signals reflected by targets 32 and 34 are received by laser light probes (12, 12a, 15, and 15a) and laser light probes (14, 14a, 17, and 17a) at different times. This difference in time $\Delta t$ may be multiplied by the rotational speed of the shaft (w) to calculate the torsional displacement in radians. Processor 10 may then calculate the torque imposed on rotating shaft 20 based on its calculated torsional displacement. In one embodiment, the torque may be calculated from the torsional displacement using a finite element model analysis, and power generated by gas turbine 40 may be determined based on the calculated torque. In particular, torque on shaft 20 may be calculated from the torsional displacement as follows. If shaft 20 comprises a uniform material at a constant temperature and its cross-sectional area is uniform and constant over its entire length, then torque may be calculated using the closed form solution:

$$\tau = \frac{(\theta)(G)(J)}{(L)}$$

Where $\tau$=torque on shaft 20, $\theta$=torsional displacement in radians (angle change measured by probes (12, 12a, 15, and 15a) and probes (14, 14a, 17, and 17a) and calculated by processor 10), G=shear modulus of the material of shaft 20 (e.g., available in engineering handbooks, calculated using self-calibration), j=polar moment of inertia and L=axial distance between probes 12/12a and 14/14a. The polar moment of inertia (j) is the inherent stiffness of shaft 20 and can be calculated for a solid circular cross section where R=radius of shaft 20, by:

$$j = \frac{(\pi)(R^4)}{2}$$

The torque calculation becomes more complex to precisely determine if any one or more of the following occur: Shear modulus (G) changes along the length and/or radial direction (e.g., due to temperature changes of the shaft material or use of a different material), the cross-sectional area of shaft 20 is not uniform (e.g., keyway notch), and/or the cross-sectional area is not constant along the length of shaft 20.

While shaft 20 illustrated in the exemplary embodiment of FIG. 2 is rotated by a gas turbine 40, those skilled in the art will appreciate that shaft 20 may alternatively be rotated by another machine such as a steam turbine, nuclear power generator or internal combustion engine. Moreover, although shaft 20 transmits the rotational force exerted on it from gas turbine 40 to rotate a magnet 64 in power generator 60, those skilled in the art will appreciate that shaft 20 can be alternatively connected to drive other loads. For example, shaft 20, once rotated by a machine such as turbine 40, can be used to drive other loads such as rotating a propeller on a vehicle.

Figure 3:
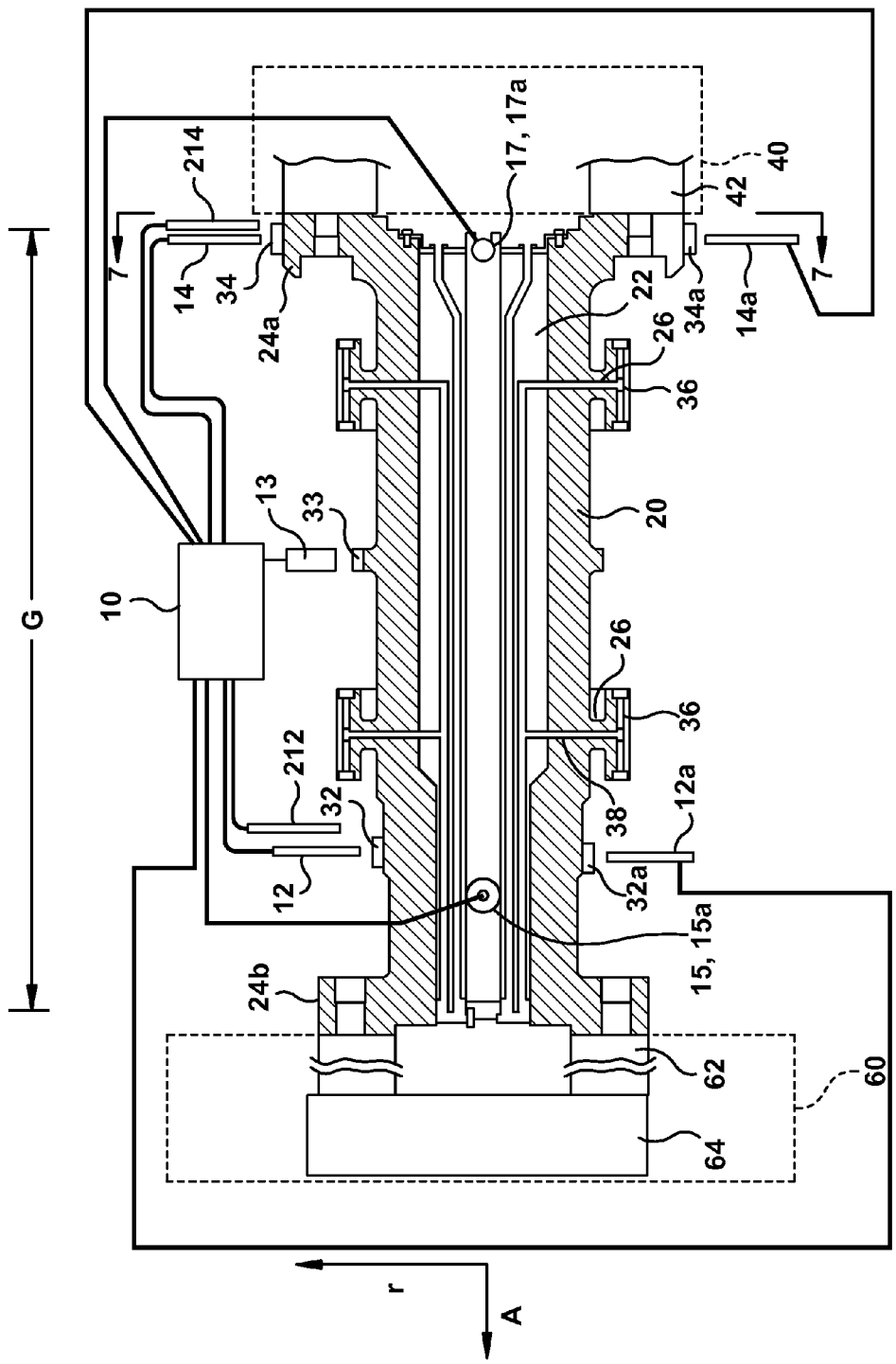
FIG. 3 shows a cross-sectional view of a rotating shaft in a combined cycle power generation system in accordance with embodiments of the invention.
Figure 4:
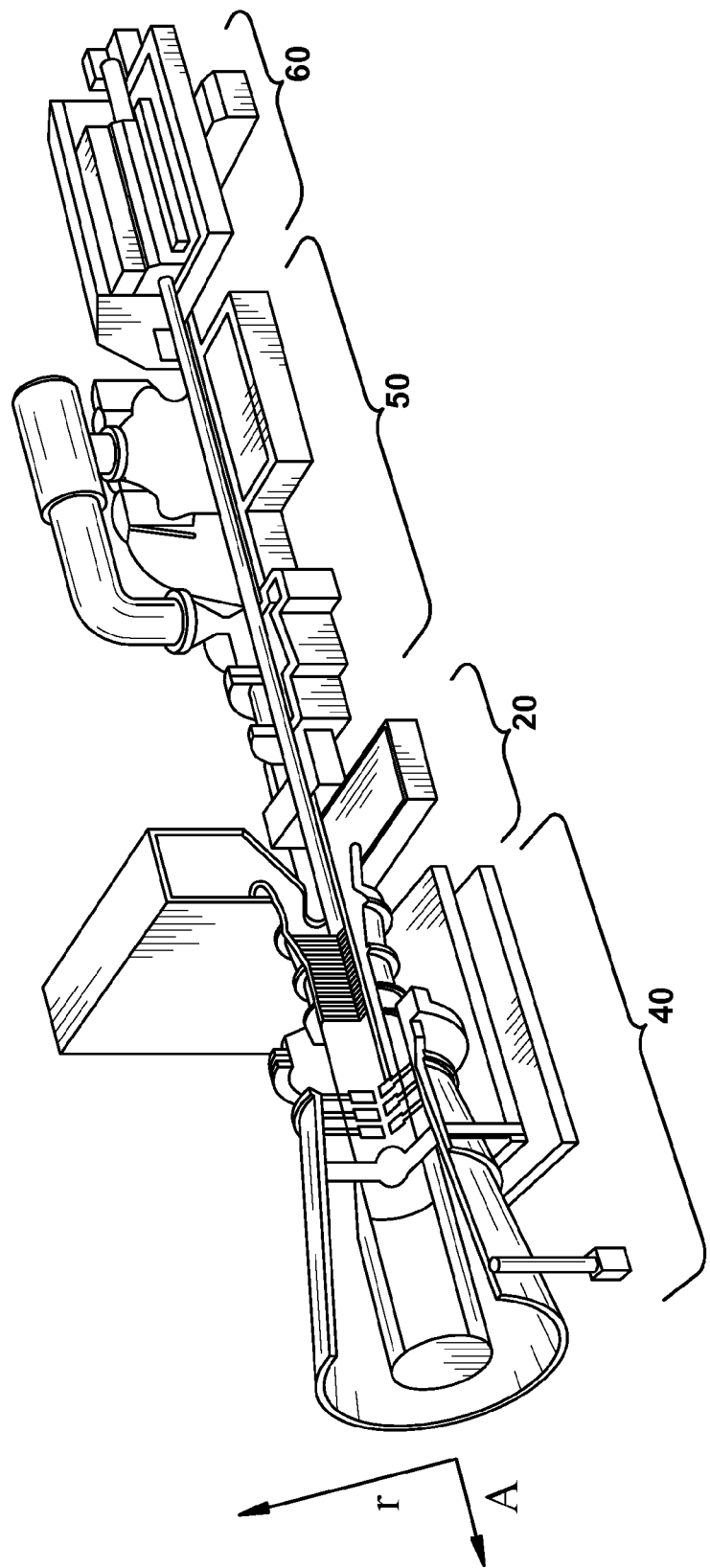
FIG. 4 shows a perspective view of the combined cycle power generation system of FIG. 2 in accordance with embodiments of the invention.
Figure 5:
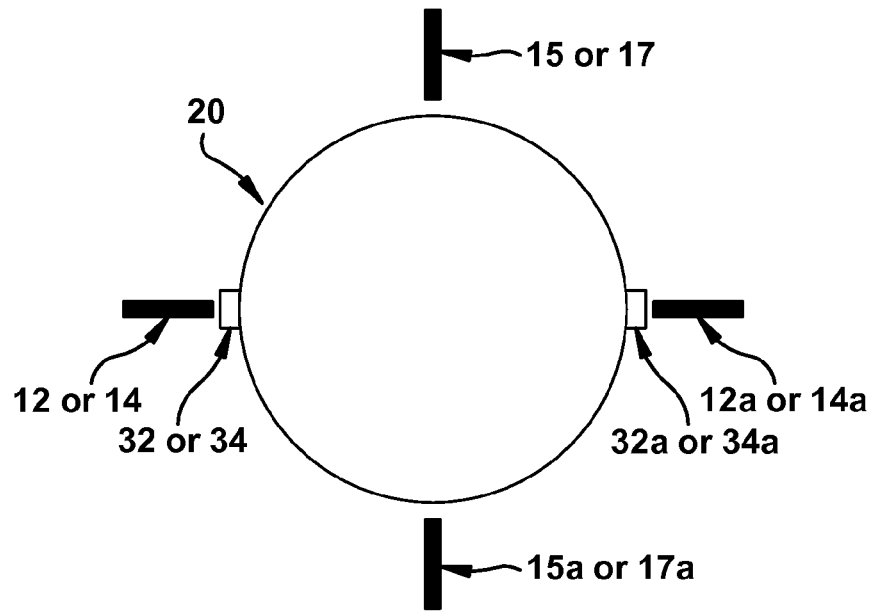
FIG. 5 shows a cross-sectional view of a rotating shaft taken along view line 7-7 of FIG. 2 or 3 according to an embodiment of the invention.
Figure 6:
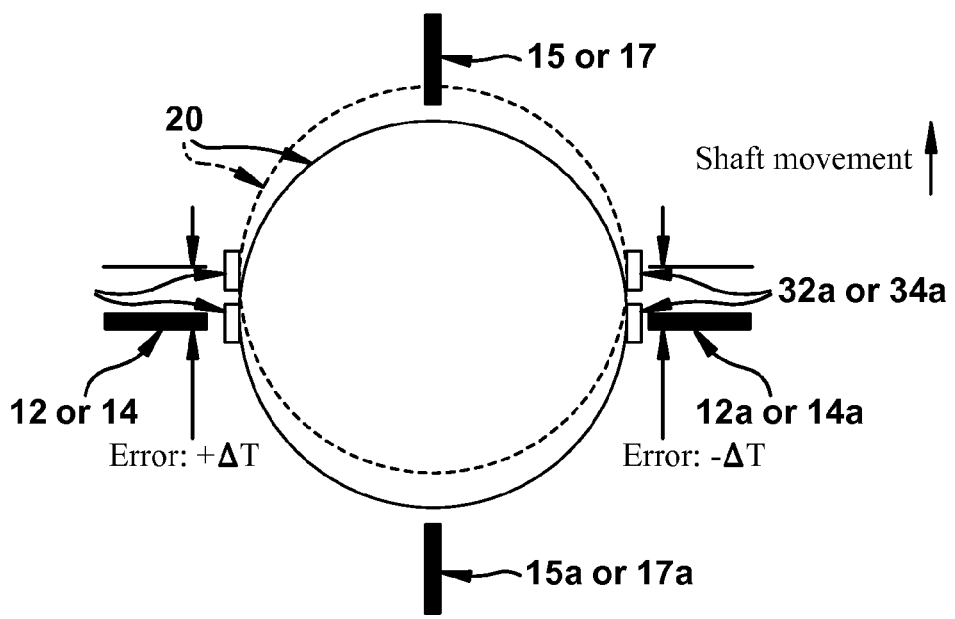
FIG. 6 shows a cross-sectional view of a rotating shaft taken along view line 7-7 of FIG. 2 or 3 including a graphical representation of target displacement by shaft movement according to embodiments of the invention.

FIGS. 3-4 illustrate another exemplary embodiment of the present invention. Reference numbers corresponding to parts previously described for previous embodiments will remain the same. Only the differences from previous embodiments will be discussed in detail. While FIG. 2 illustrates shaft 20 as part of a simple cycle power generation system, FIGS. 3-4 illustrate shaft 20 as part of a combined cycle power generation system. Specifically, shaft 20 illustrated in FIGS. 3-4 is rotated by gas turbine 40 while steam turbine 50 imposes a rotational force on generator shaft 62 of power generator 60. Axial end 24a of shaft 20 is connected to turbine shaft 42 of gas turbine 40 and axial end 24b of shaft 20 is connected to steam turbine shaft 52 of steam turbine 50. Gas turbine 40 rotates turbine shaft 42 to rotate shaft 20 and, in turn, shaft 20 rotates steam turbine shaft 52 of steam turbine 50. Thus, the torque imposed on shaft 20 by gas turbine 40 is transmitted to steam turbine shaft 52 which then imposes a torque on generator shaft 62. Generator shaft 62 is thus subject to the combined rotational forces from steam turbine 50 and gas turbine 40. Magnet 64 of power generator 60 thus rotates as a result of rotational forces provided by steam turbine 50 and gas turbine 40.

As discussed in the embodiment of FIG. 2, as shaft 20 is rotated by gas turbine 40, signals transmitted from probes 12, 12a, 15, and 15a are reflected by targets 32 and 32a and probes 14, 14a, 17, and 17a are reflected by targets 34 and 34a, respectively, as they revolve and pass underneath probes 12, 12a, 14, 14a, 15, 15a, 17, and 17a. The signals reflected from targets 32, 32a, 34 and 34a are received by probes 12, 12a, 14, 14a, 15, 15a, 17, and 17a and their respective times of arrival are measured. Processor 10 then calculates the difference in the time at which signals are received by probes 12, 12a, 14, 14a, 15, 15a, 17, and 17a to determine a torsional displacement and then determines a torque imposed on shaft 20 based upon its torsional displacement. Power generated by gas turbine 40 can be calculated from the determination of torque.

As shaft 20 twists when it is loaded, targets 32 and 34 will be displaced from one another as discussed above. These targets 32 and 34 will also be displaced from one another if shaft 20 vibrates. The displacement from shaft vibration can be measured through the use of additional targets 32a and 34a. By assessing the time of arrival of at least one of the sets of targets 32 and 32a (or 34 and 34a) within one revolution of shaft 20 and comparing it to the expected time of arrival based on the actual distance between the targets 32 and 32a and the rotational speed of shaft 20, the displacement from vibration can be calculated. For example, if targets 32 and 32a are circumferentially offset from one another by 180 degrees. (see FIG. 6), the respective times of arrival of signals detected by probe 12 may be expected to be one-half of the time required for one complete rotation. The time for a complete rotation may be determined through the operation of revolutional probe 13 and revolutional target 33 as discussed above. The displacement of shaft 20 due to its vibration may then be determined by the difference between the expected time difference and the actual time difference that respective response signals from targets 32 and 32a are detected by probes 12 and/or 12a and/or the difference between the expected time difference and the actual time difference that respective response signals from targets 34 and 34a are detected probe 14 and/or 14a. The total torsional displacement may thus be determined by adding the displacement caused by the vibration and the load displacement (i.e., the torsional displacement caused by the rotational force imposed on shaft 20). Accordingly, by bonding additional targets 32a and/or 34a to shaft 20 and detecting response signals therefrom utilizing probes 12, 12a, 14, and/or 14a, a correctional value may be determined for the torsional displacement resulting from the rotational force imposed on shaft 20. Accuracy in the torsional displacement measurement may therefore be enhanced.

In this embodiment, torque 27 may cause shaft 20 to torsionally and/or axially displace along an axial length of shaft 20 causing a second end 23 of shaft 20 (shown in phantom) to move axially and/or radially relative to a first end 25 of shaft 20. As can be seen, second end 23 may displace proportionally relative to torque 27 in a radial direction. A set of targets disposed about shaft 20 may also be displaced by this torsional displacement creating a difference between a set of probes on first end 25 and second end 23.

Figure 7:
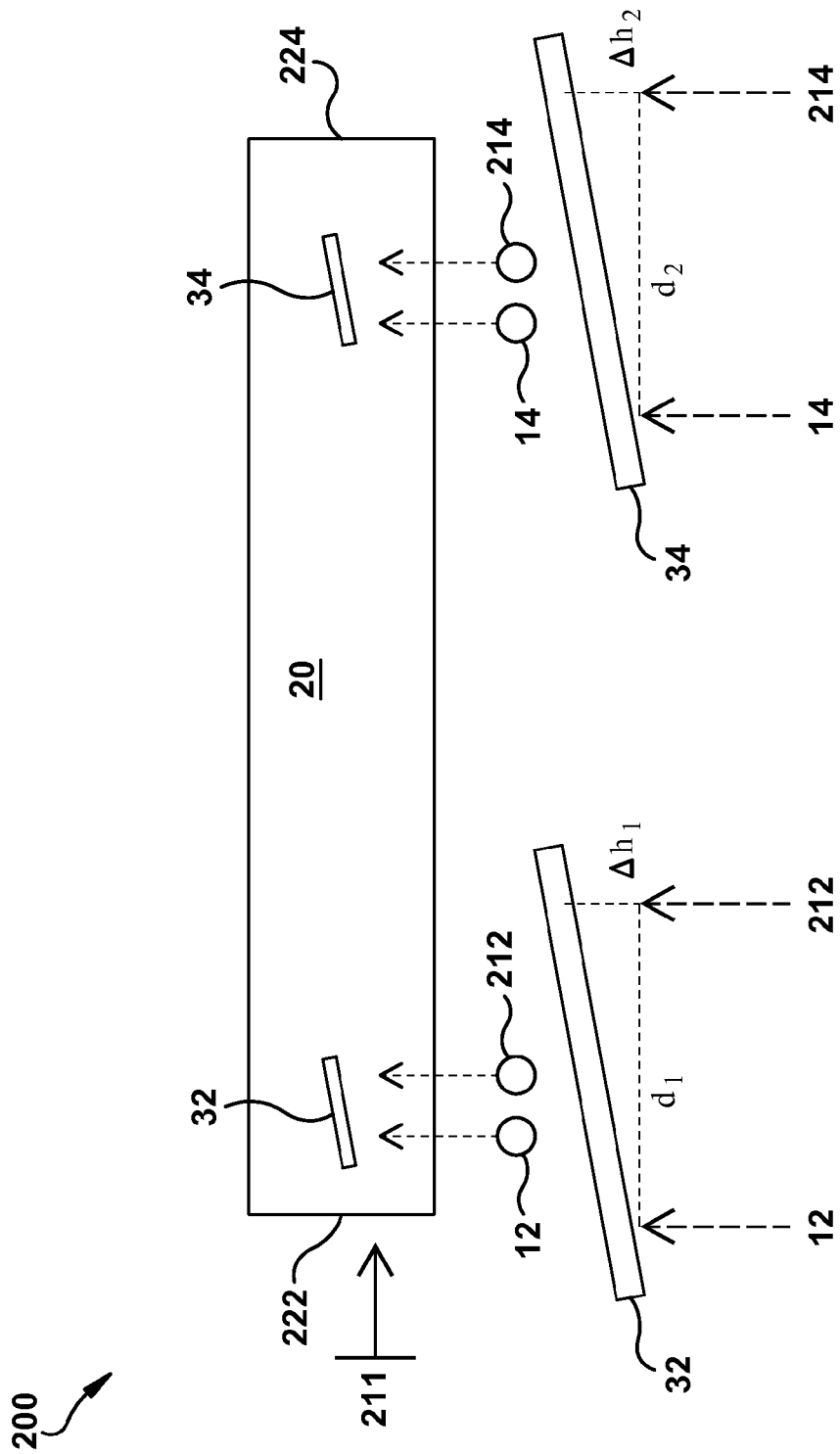
FIG. 7 shows a schematic view of a target monitoring system in accordance with embodiments of the invention.

Turning to FIG. 7, a schematic view of a target monitoring system 200 disposed about a shaft 20 is shown according to embodiments of the invention. In this embodiment, target monitoring system 200 includes a first horizontal probe 12 and a first axial probe 212 located proximate shaft 20 and target 32. First horizontal probe 12 and first axial probe 212 are located a first predetermined axial distance '$d_1$' apart from one another. In an embodiment, $d_{1-2}$ may be an axial distance relative to shaft 20. In one embodiment, first predetermined axial distance $d_1$ may be about 3 centimeters (cm). As a result of distance $d_1$, first horizontal probe 12 and first axial probe 212 may have unique sight lines (shown in phantom) to target 32. These unique sidelines may enable processor 10 to determine a first offset $\Delta h_1$ between probes 12 and 212 which may be used to determine a first gradient for target 32. Similarly, a second axial probe 214 and a second horizontal probe 14 may be used to determine a second gradient for a target 34 located proximate a second end 224 of shaft 20. More specifically, as shown in FIG. 7, second horizontal probe 14 and second axial probe 214 are located a second predetermined axial distance '$d_2$' apart from one another. In an embodiment, as shown in FIG. 7, second predetermined axial distance $d_2$ may be substantially equal to first predetermined axial distance $d_1$ (e.g., about 3 cm). However, it may be understood that first predetermined axial distance $d_1$ and second predetermined axial distance $d_2$ do not need to be substantially equal, as long as first predetermined axial distance $d_1$ and second predetermined axial distance $d_2$ remain constant during the determining process discussed herein. These unique sidelines may enable processor 10 to determine a second offset $\Delta h_2$ between probes 14 and 214 which may be used to determine a second gradient for target 34. The first gradient for target 32 and the second gradient for target 34 may be compared and the magnitude of any difference between the gradients may be used to calculate a difference between torque reported without respect to the gradients and actual torque. This calculated difference, due to the difference between the gradients, may be used to correct the reported torque measurement. Target monitoring system 200 further includes end probe 211 which is disposed proximate a first end 222 of shaft 20 and is configured to monitor axial movement of shaft 20 during operation.

First predetermined axial distance $d_1$ and second predetermined axial distance $d_2$ may be determined prior to operation of turbine 2 (FIG. 1). Additionally, during operation of turbine 2 (FIG. 1) and target monitoring system 200, signals from probes 12, 212, 14 and 214, respectively, are measured. Processor 10, receiving signals from probes 12, 212, 14 and 214, respectively, may then calculate first offset $\Delta h_1$ for target 32 and second offset $\Delta h_2$ for target 34. Processor 10 may subsequently calculate the gradients for each respective target 32, 34, relating to the measured axial movement discussed herein, by:

$$\text{Gradient} = \frac{\Delta h}{d}$$

Figure 8:
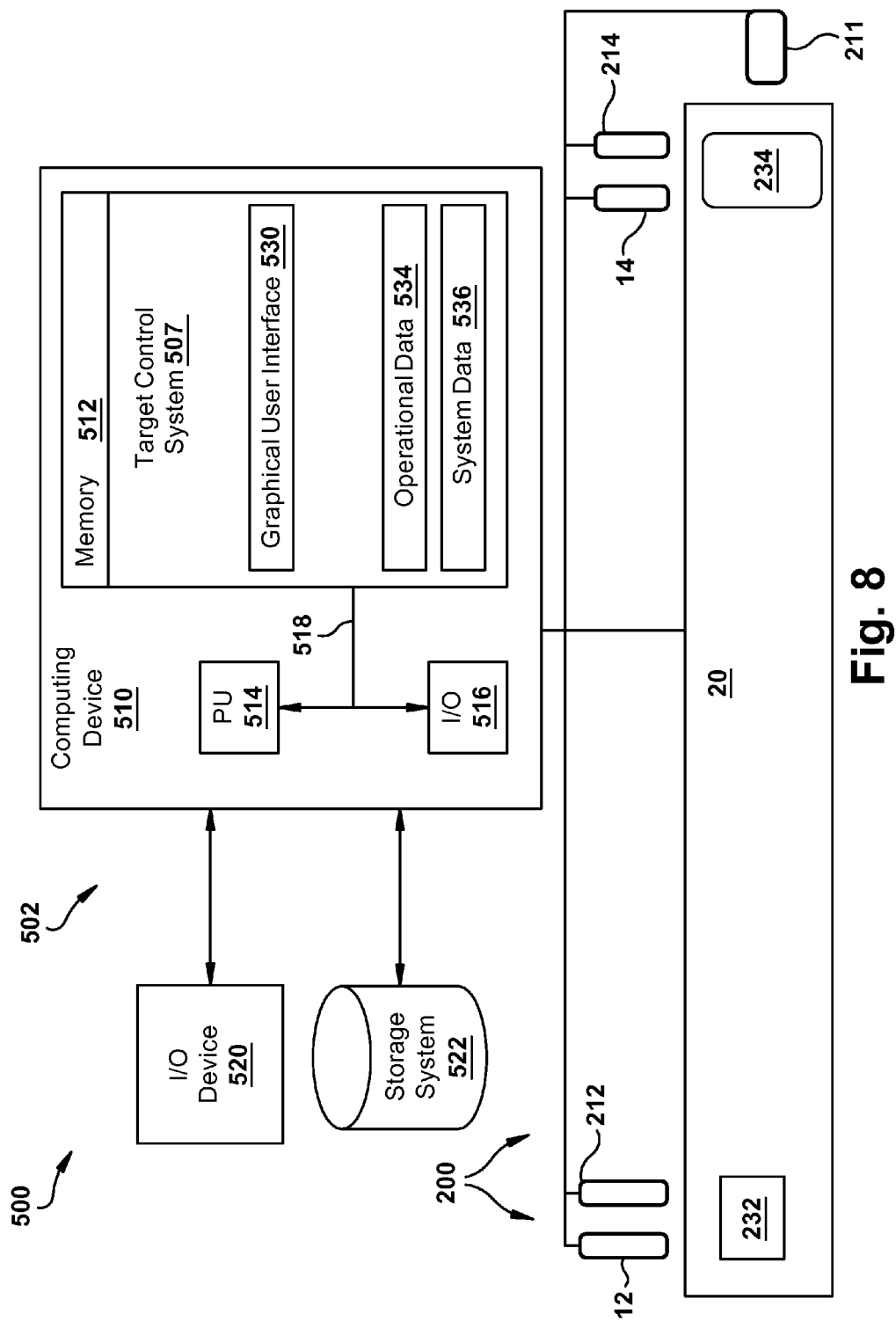
FIG. 8 shows a schematic illustration of an environment including a control system in accordance with an embodiment of the invention.

Turning to FIG. 8, a target control system 500 is shown including a first target 232 and a fifth target 234 communicatively connected to a computing device 510 and a shaft 20 according to embodiments of the invention. Target control system 500 includes a computer infrastructure 502 that can perform the various processes described herein. In particular, computer infrastructure 502 is shown including computing device 510 which includes a target displacement system 507, which enables computing device 510 to monitor shaft 20 and targets 232 and 234 via probes 12, 14, 211, 212, and 214, and analyze and/or predict displacements and/or movements of portions of shaft 20 by performing the process steps of the disclosure. In an embodiment, computing device 510 may determine a set of gradients for first target 232 and second target 234 during non-load conditions and then determine axial movement of shaft 20 during operation via end probe 211. Computing device 510 may then determine a product of the gradient for each device and the axial movement of shaft 20 and factor this product into torque and/or power output determinations. In one embodiment, computing device 510 may determine a displacement between a first end of shaft 20 and a second end of shaft 20. Target control system 500 may be operated manually by a technician, automatically by computing device 510, and/or in conjunction with a technician and computing device 510.

As previously mentioned and discussed further below, target displacement system 507 has the technical effect of enabling computing device 510 to perform, among other things, the displacement and/or shaft movement monitoring, adjustment and/or regulation described herein. It is understood that some of the various components shown in FIG. 8 can be implemented independently, combined, and/or stored in memory for one or more separate computing devices that are included in computing device 510. Further, it is understood that some of the components and/or functionality may not be implemented, or additional schemas and/or functionality may be included as part of target displacement system 507.

Computing device 510 is shown including a memory 512, a processor unit (PU) 514, an input/output (I/O) interface 516, and a bus 518. Further, computing device 510 is shown in communication with an external I/O device/resource 520 and a storage system 522. As is known in the art, in general, PU 514 executes computer program code, such as thermal management system 507, that is stored in memory 512 and/or storage system 522. While executing computer program code, PU 514 can read and/or write data, such as graphical user interface 530 and/or operational data 532, to/from memory 512, storage system 522, and/or I/O interface 516. Bus 518 provides a communications link between each of the components in computing device 510. I/O device 520 can comprise any device that enables a user to interact with computing device 510 or any device that enables computing device 510 to communicate with one or more other computing devices. Input/output devices (including but not limited to keyboards, displays, pointing devices, etc.) can be coupled to the system either directly or through intervening I/O controllers.

In some embodiments, as shown in FIG. 8, target control system 500 may include set of probes 12, 14, 211, 212, and 214 communicatively connected to shaft 20 via targets 232 and 234, and communicatively connected to computing device 510 (e.g., via wireless or hard-wired means). Targets 232 and 234 may obtain a set of operational data 532 (e.g., displacements, locations, distances, etc.) and transmit operational data 532 to computing device 510 for processing with target displacement system 507 as a part of torque and/or output determination calculations. In one embodiment, computing device 510 may include system data 536 (e.g., distances between targets, a length of shaft 20, a metallurgical composition of shaft 20, etc.) and a graphical user interface 530 for display of measurements and calculations to a technician.

In any event, computing device 510 can comprise any general purpose computing article of manufacture capable of executing computer program code installed by a user (e.g., a personal computer, server, handheld device, etc.). However, it is understood that computing device 510 is only representative of various possible equivalent computing devices and/or technicians that may perform the various process steps of the disclosure. To this extent, in other embodiments, computing device 510 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 510 may be/include a distributed control system.

Figure 9:
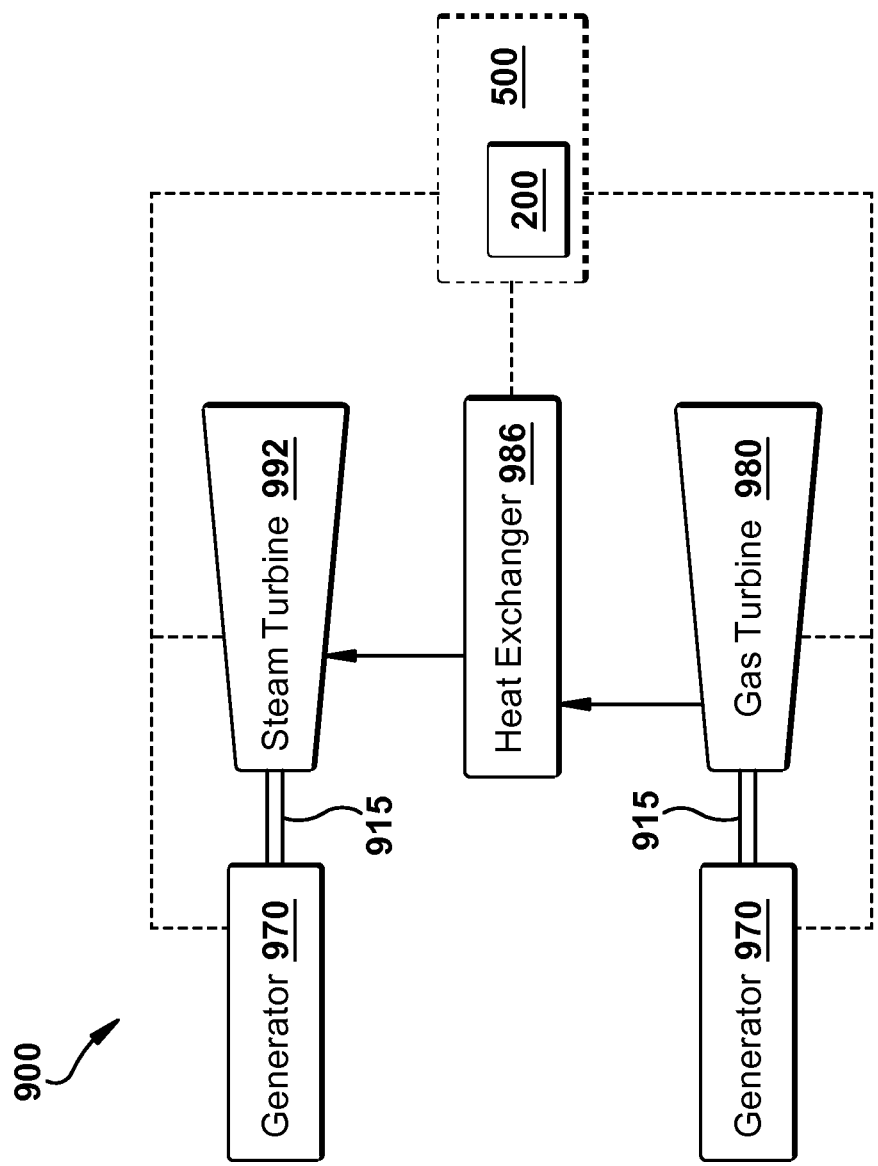
FIG. 9 shows a schematic block diagram illustrating portions of a combined cycle power plant system according to embodiments of the invention.
Figure 10:
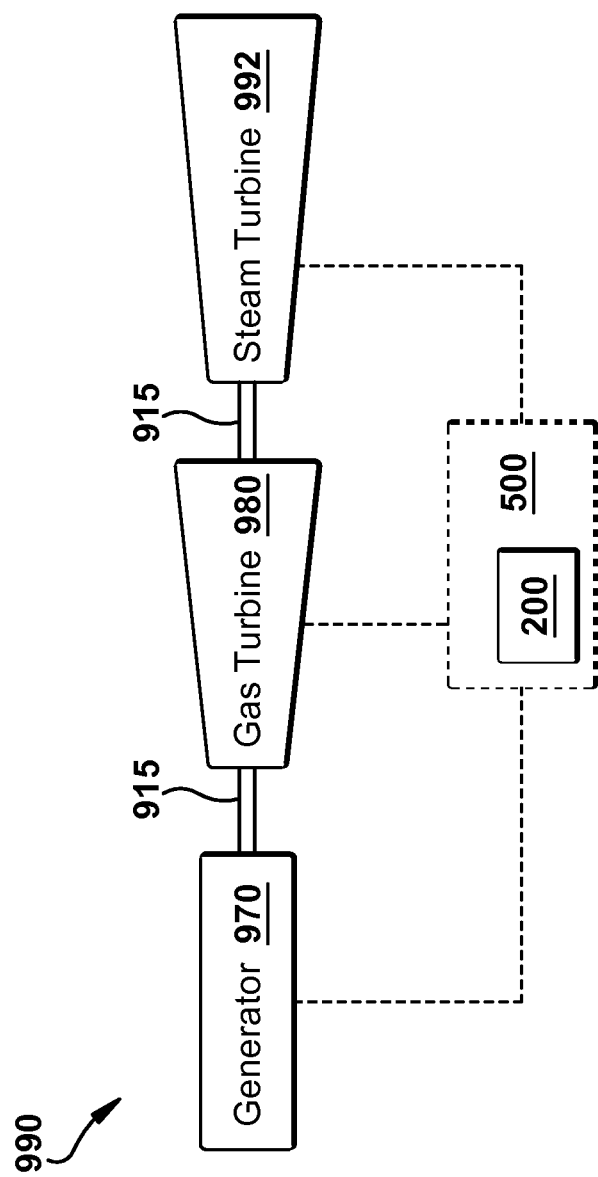
FIG. 10 shows a schematic block diagram illustrating portions of a single-shaft combined cycle power plant system according to embodiments of the invention.

Turning to FIG. 9, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 9 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include target monitoring system 200 of FIG. 7 or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 10, a single shaft combined cycle power plant 990 may include a single generator 970 coupled to both gas turbine 980 and steam turbine 992 via a single shaft 915. Steam turbine 992 and/or gas turbine 980 may include target monitoring system 200 of FIG. 7 or other embodiments described herein.

Although discussed herein as being utilized within power generation systems (e.g., gas turbine systems), it is understood that target monitoring system 200 may be utilized by system or component utilizing a shaft for power transmission. For example, target monitoring system 200 may be utilized by systems including, but not limited to: power generation systems, ship propulsion systems, aircraft propulsion systems, etc.

Additional details for this invention may be found in U.S. Pat. No. 7,415,363.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the shaft displacement and/or movement monitoring of the apparatus and devices described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A target monitoring system comprising:
   a first horizontal probe located radially outboard of a shaft and communicatively connected to at least one first horizontal target connected to the shaft, the at least one first horizontal target disposed proximate a first end of the shaft;
   a first axial probe located axially adjacent to the first horizontal probe and communicatively connected to the at least one first horizontal target;
   a second horizontal probe located radially outboard of the shaft communicatively connected to at least one second horizontal target connected to the shaft, the at least one second horizontal target disposed proximate a second end of the shaft;
   a second axial probe located axially adjacent to the second horizontal probe and communicatively connected to the at least one second horizontal target;
   an end probe disposed proximate the first end of the shaft, the end probe configured to monitor axial movement of the shaft; and
   a computing device communicatively connected to the end probe and each of the first horizontal probe, the first axial probe, the second horizontal probe and the second axial probe,
   wherein the computing device is configured to:
      determine a first gradient for the at least one first horizontal target based on a displacement between the first horizontal probe and the at least one first horizontal target and the first axial probe and the at least one first horizontal target; and
      determine a second gradient for the at least one second horizontal target based on a displacement between the second horizontal probe and the at least one second horizontal target and the second axial probe and the at least one second horizontal target.

2. The target monitoring system of claim 1, wherein the end probe includes at least one of: a Bentley Nevada probe, a clearance probe and a magnetic pick-up probe.

3. The target monitoring system of claim 1, wherein at least one of the first horizontal probe, the first axial probe, the second horizontal probe, and the second axial probe include an optical probe.

4. The target monitoring system of claim 1, wherein the first horizontal probe and the first axial probe are located a predetermined distance apart in the axial direction relative to the shaft.

5. The target monitoring system of claim 1, wherein the computing device is configured to determine misalignment between the at least one first horizontal target and the at least one second horizontal target based on the axial movement of the shaft and the first gradient and the second gradient of the at least one first horizontal target and the at least one second horizontal target.

6. The target monitoring system of claim 1, further comprising a plurality of targets disposed circumferentially about the shaft and communicatively connected to at least one of: the first horizontal probe, the first axial probe, the second horizontal probe, and the second axial probe.

7. The target monitoring system of claim 6, further comprising a plurality of probes communicatively connected to the plurality of targets and the computing device, the computing device further configured to monitor the plurality of targets during rotation of the shaft via the plurality of probes,
   wherein the computing device is configured to determine torsional displacement of the shaft based on the monitoring of the plurality of targets, and
   wherein the computing device is configured to factor axial movement of the shaft in the torsional displacement determination.

8. A method comprising:
   determining a first primary displacement between a first horizontal probe and at least one first target on a shaft, the at least one first target located proximate a first end of the shaft;
   determining a second primary displacement between a first axial probe and the at least one first target;
   calculating a first gradient of the at least one first target based on the first primary displacement and the second primary displacement;
   monitoring axial movement of the shaft via an end probe; and
   determining an amount of false twisting of the shaft at load condition based on:
      a difference between the first gradient and a calculated second gradient; and
      the axial movement of the shaft.

9. The method of claim 8, further comprising:
   determining a first secondary displacement between a second horizontal probe and at least one second target on the shaft, the at least one second target located proximate a second end of the shaft;
   determining a second secondary displacement between a second axial probe and the at least one second target; and
   calculating the second gradient of the second target based on the first secondary displacement and the second secondary displacement.

10. The method of claim 8, wherein the shaft is at a no load condition during the determining of the first displacement and the determining of the second displacement.

11. The method of claim 8, wherein the shaft is at a load condition during the monitoring of the axial movement.

12. The method of claim 8, wherein the end probe includes at least one of: a Bentley Nevada probe, a clearance probe and a magnetic pick-up probe.

13. The method of claim 8, wherein the first horizontal probe and the first axial probe are located a predetermined distance apart in the axial direction relative to the shaft.

14. The method of claim 8, wherein at least one of the first horizontal probe, the first axial probe, the second horizontal probe, and the second axial probe include an optical probe.

15. The method of claim 8, further comprising:
monitoring via a computing device a plurality of probes communicatively connected to a plurality of targets disposed on the shaft, the computing device configured to monitor the plurality of targets during rotation of the shaft via the plurality of probes,
wherein the computing device is configured to determine torsional displacement of the shaft based on the monitoring of the plurality of targets, and
wherein the computing device is configured to factor axial movement of the shaft in the torsional displacement determination.

16. A turbine comprising:
a stator;
a working fluid passage substantially surrounded by the stator; and
a shaft configured radially inboard of the stator and in the working fluid passage; and
a target monitoring system communicatively connected to the shaft and configured to monitor displacement of the shaft during operation of the turbine, the target monitoring system including:
a first horizontal probe located radially outboard of the shaft and communicatively connected to at least one first horizontal target connected to the shaft, the at least one first horizontal target disposed proximate a first end of the shaft;
a first axial probe located axially adjacent to the first horizontal probe and communicatively connected to the at least one first horizontal target;
a second horizontal probe located radially outboard of the shaft communicatively connected to at least one second horizontal target connected to the shaft, the at least one second horizontal target disposed proximate a second end of the shaft;
a second axial probe located axially adjacent to the second horizontal probe and communicatively connected to the at least one second horizontal target;
an end probe disposed proximate the first end of the shaft, the end probe configured to monitor axial movement of the shaft; and
a computing device communicatively connected to the end probe and each of the first horizontal probe, the first axial probe, the second horizontal probe and the second axial probe,
wherein the computing device is configured to:
determine a first gradient for the at least one first horizontal target based on a displacement between the first horizontal probe and the at least one first horizontal target and the first axial probe and the at least one first horizontal target; and
determine a second gradient for the at least one second horizontal target based on a displacement between the second horizontal probe and the at least one second horizontal target and the second axial probe and the at least one second horizontal target.

17. The turbine of claim 16, wherein the end probe includes at least one of: a Bentley Nevada probe, a clearance probe and a magnetic pick-up probe.

18. The turbine of claim 16, wherein at least one of the first horizontal probe, the first axial probe, the second horizontal probe, and the second axial probe include an optical probe.

19. The turbine of claim 16, wherein the first horizontal probe and the first axial probe are located a predetermined distance apart in the axial direction relative to the shaft.

20. The turbine of claim 16, wherein the computing device is configured to determine misalignment between the at least one first horizontal target and the at least one second horizontal target based on the axial movement of the shaft and the first gradient and the second gradient of the at least one first horizontal target and the at least one second horizontal target.

* * * * *